United States Patent
Kher et al.

(10) Patent No.: US 12,438,789 B2
(45) Date of Patent: Oct. 7, 2025

(54) EQUIPMENT SWAP DETECTION FOR 5G WIRELESS NETWORK

(71) Applicant: DISH Wireless L.L.C., Englewood, CO (US)

(72) Inventors: Pradipbhai Kher, Lewis Center, OH (US); Christopher Ivin, Powell, OH (US)

(73) Assignee: DISH Wireless L.L.C., Englewood, CO (US)

( * ) Notice: Subject to any disclaimer, the term of this patent is extended or adjusted under 35 U.S.C. 154(b) by 141 days.

(21) Appl. No.: 18/499,084

(22) Filed: Oct. 31, 2023

(65) Prior Publication Data

US 2025/0141770 A1    May 1, 2025

(51) Int. Cl.
*H04L 43/0817* (2022.01)
*H04L 41/12* (2022.01)
*H04L 43/04* (2022.01)
*H04L 43/065* (2022.01)

(52) U.S. Cl.
CPC .......... *H04L 43/0817* (2013.01); *H04L 41/12* (2013.01); *H04L 43/04* (2013.01); *H04L 43/065* (2013.01)

(58) Field of Classification Search
CPC ..... H04L 43/0817; H04L 41/12; H04L 43/04; H04L 43/065
See application file for complete search history.

(56) References Cited

U.S. PATENT DOCUMENTS

| 11,516,721 | B1* | 11/2022 | Kuppuswamy | H04W 40/02 |
| 2003/0040281 | A1* | 2/2003 | Nakao | H04B 7/08 |
| | | | | 455/67.11 |
| 2022/0345915 | A1* | 10/2022 | Mukherjee | H04L 45/50 |
| 2025/0141508 | A1* | 5/2025 | Huang | H04B 7/0452 |

* cited by examiner

*Primary Examiner* — Abdulkader M Alriyashi
(74) *Attorney, Agent, or Firm* — KW Law, LLP (57) ABSTRACT

Systems, devices, and automated processes are described to provide detection of incorrectly connected equipment at one or more cell sites, such as those used to implement a 5G or other mobile network. Systems and automated processes may retrieve a serial number and MAC address from one or more RUs at a cell site, may retrieve interface information from a cell site router to which the one or more RUs are coupled, and may retrieve information identifying assigned cell sector and spectrum band for the one or more RUs from a management system of the network. The systems and automated processes may map the RUs to ports of the CSR, may determine which RU is actually connected to each port, and may compare this to the RU that is expected to be connected to each port based on a predetermined configuration for the cell site. Reports may also be generated accordingly.

20 Claims, 4 Drawing Sheets

EQUIPMENT SWAP DETECTION FOR 5G WIRELESS NETWORK

TECHNICAL FIELD

The following generally relates to wireless data networks, such as 5G wireless networks. More particularly, the following relates to systems, devices, and automated processes to monitor and/or detect changes or improper setup of equipment at a cell site.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers, and other devices. 5G technologies are capable of supplying much greater bandwidth than was previously available, so it is likely that the widespread deployment of 5G networks could radically expand the number of services available to customers.

Traditionally, data and telephone networks relied upon proprietary designs based upon very specialized hardware and dedicated point-to-point data connections. More recently, industry standards such as the Open Radio Access Network ("Open RAN" or "O-RAN") standard have been developed to describe interactions between the network and various client devices. The O-RAN model follows a virtualized wireless architecture in which 5G base stations ("gNBs") are implemented using separate centralized units (CUs), distributed units (DUs) and radio units (RUs), along with various control planes that provide additional network functions (e.g., 5G Core, IMS, OSS/BSS/IT). Generally speaking, it is still necessary to implement the RUs with physical transmitters, antennas, routers, and other hardware located onsite within broadcast range of the end user's device.

Other components of the network, however, can be implemented using a more centralized architecture based upon cloud-based computing resources, such as those available from Amazon Web Services (AWS) or the like. This provides much better network management, scalability, reliability and redundancy, as well as other benefits. O-RAN CUs, DUs, control planes and/or other components of the network can now be implemented as software modules executed by distributed (e.g., "cloud") computing hardware. Other network functions such as access control, message routing, security, billing and the like can similarly be implemented using centralized cloud computing resources. Often, a CU, DU, control plane or other image is created in software for execution by one or more virtual computers operating in parallel within the cloud environment. The many virtual servers can be very rapidly scaled to increase or decrease the available computing capacity as needed.

The use of virtualized hardware provides numerous benefits in terms of rapid deployment and scalability, but it also presents certain technical challenges that have not been encountered in more traditional wireless networks. Unlike traditional wireless networks that scaled through the addition of physical routers, switches and other hardware, RAN networks can scale upwardly and downwardly very quickly as new cloud-based services are deployed and/or existing services are retired or redeployed. Additional network components can be very quickly deployed, for example, through the use of virtual components executing in a cloud environment that can be very quickly duplicated and spawned as needed to support increased demand. Similarly, virtual components can be de-commissioned very quickly with very little cost or effort when network capacity allows. The virtual components provide substantial efficiencies, especially when compared to prior networks that were based upon complex interconnections between geographically dispersed routers, servers and the like.

The rapid deployment and scalability of RAN networks can be impacted by improper setup of cell site. For example, when a new cell site is set up, or equipment swapped during maintenance, there are a number of connections between RUs, antennas, routers, and the like that must be done correctly. The network operator may have prescribed, pre-defined, or otherwise standardized how each of these components is to be connected, to facilitate rapid scaling via the virtual components of the network. However, given the complexity of connections and other factors, mistakes in the connectivity of the components may occur. Such mistakes may happen upon initial setup of the cell site, or when components are to be replaced (e.g., swapped out). Manually determining such misconnections is subject to inefficiencies such as not detecting all misconnections at a cell site, which can lead to multiple attempts to fix a cell site. High availability is required for the cell site to minimize data and voice service interruptions, so it is desirable to increase the speed of determining cell site issues and the efficiency in correcting such issues.

One technical challenge that arises in the new networks, therefore, involves monitoring the status, performance, and connectivity of the networks. Network components can be commissioned and de-commissioned very rapidly, and conditions can evolve very quickly in various parts of the network. Tracking the performance, status, and connectivity of a large-scale RAN network can therefore be very difficult due to the scale of resources involved and the dynamic nature of such networks.

As new networks are developed and deployed, then, substantial challenges arise in tracking the performance and connectivity of the network and its many distributed components. A substantial desire therefore exists to build systems, devices and automated processes that allow for monitoring and control of emerging 5G wireless networks. These and other features are described in increasing detail below.

BRIEF SUMMARY

Various embodiments relate to systems, devices, and automated processes to provide detection and monitoring of the connection status of various components of one or more cell sites, such as those used to implement a 5G or other mobile network. According to various embodiments, systems and automated processes may automatically determine if a cell site is configured incorrectly, for example if one or more radio units are misconnected to cell site equipment such as a cell site router. The systems and automated processes may provide dashboards, reports, alerts, or other information about the state of one or more cell sites.

In various embodiments, an automated process may be performed by a data processing system associated with a wireless network, the data processing system having a processor, a data storage, and an interface to the wireless network, the wireless network having an operating support system (OSS) and a cell site having one or more radio units (RUs) and a cell site router (CSR), the automated process suitably comprising: obtaining, from a first RU of the one or more RUs, a MAC address and a serial number: associating a CSR port with the first RU based on the obtained MAC address: determining an expected RU identifier based on the associated CSR port: obtaining, from the OSS, an RU label based on the obtained serial number; determining an actual RU identifier based on the RU label; comparing the actual RU identifier to the expected RU identifier; and reporting an RU misconnection when the actual RU identifier does not match the expected RU identifier.

Still other embodiments provide a data processing system associated with a wireless network, the data processing system comprising a processor, a data storage, and an interface to the wireless network, the wireless network comprising an operating support system (OSS) and a cell site having one or more radio units (RUs) and a cell site router (CSR), the data storage comprising non-transitory computer-executable instructions that, when executed by the processor, perform an automated process comprising: obtaining, from a first RU of the one or more RUs, a MAC address and a serial number; associating a CSR port with the first RU based on the obtained MAC address; determining an expected RU identifier based on the associated CSR port; obtaining, from the OSS, an RU label based on the obtained serial number; determining an actual RU identifier based on the RU label; comparing the actual RU identifier to the expected RU identifier; and reporting an RU misconnection when the actual RU identifier does not match the expected RU identifier.

Still other embodiments provide an automated process performed by a data processing system associated with a wireless network, the data processing system comprising a processor, a data storage, and an interface to the wireless network, the wireless network comprising an operating support system (OSS) and a cell site having one or more radio units (RUs) and a cell site router (CSR), the automated process comprising: obtaining, from a first RU of the one or more RUs, a MAC address and a serial number; associating a CSR port with the first RU based on the obtained MAC address; determining a first cell site sector and a first spectrum band based on the associated CSR port; obtaining, from the OSS, an RU label based on the obtained serial number; determining a second cell site sector and a second spectrum band based on the RU label; comparing the first cell site sector to the second cell site sector and the first spectrum band to the second spectrum band; and determining an RU misconnection when at least one of the first and second cell site sector and the first and second spectrum band do not match.

These and other example embodiments are described in increasing detail below.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, equipment swap detection systems and methods obtain data relating to RUs connected to a cell site router and data relating to the expected and actual connection of the RUs, and analyzes the data to determine whether one or more RUs has been incorrectly connected to the cell site router. The systems and methods may map RU serial numbers and/or MAC addresses to CSR ports, may determine an expected connection for the CSR port, and may report any determined misconnections. The systems and methods may create reports, dashboards, alerts, or the like, indicating the status of various equipment at a cell site and identifying any issues.

The automated processes and systems may leverage information available from a virtualized network management system such as an operational support system (OSS), element management system (EMS), and the like. Use of the automated processes and systems described herein allows for real time (or near real time) monitoring of the status of a cell site and misconnection of equipment at the cell site in a manner not previously possible. The use of the swap detection system and methods allows for a complete view of cell site status and efficient correction of errors in cell site setup-rather than sending technicians to correct one problem at a time as they are determined, a technician can be sent to a cell site with a complete list of items to address.

Figure 1:
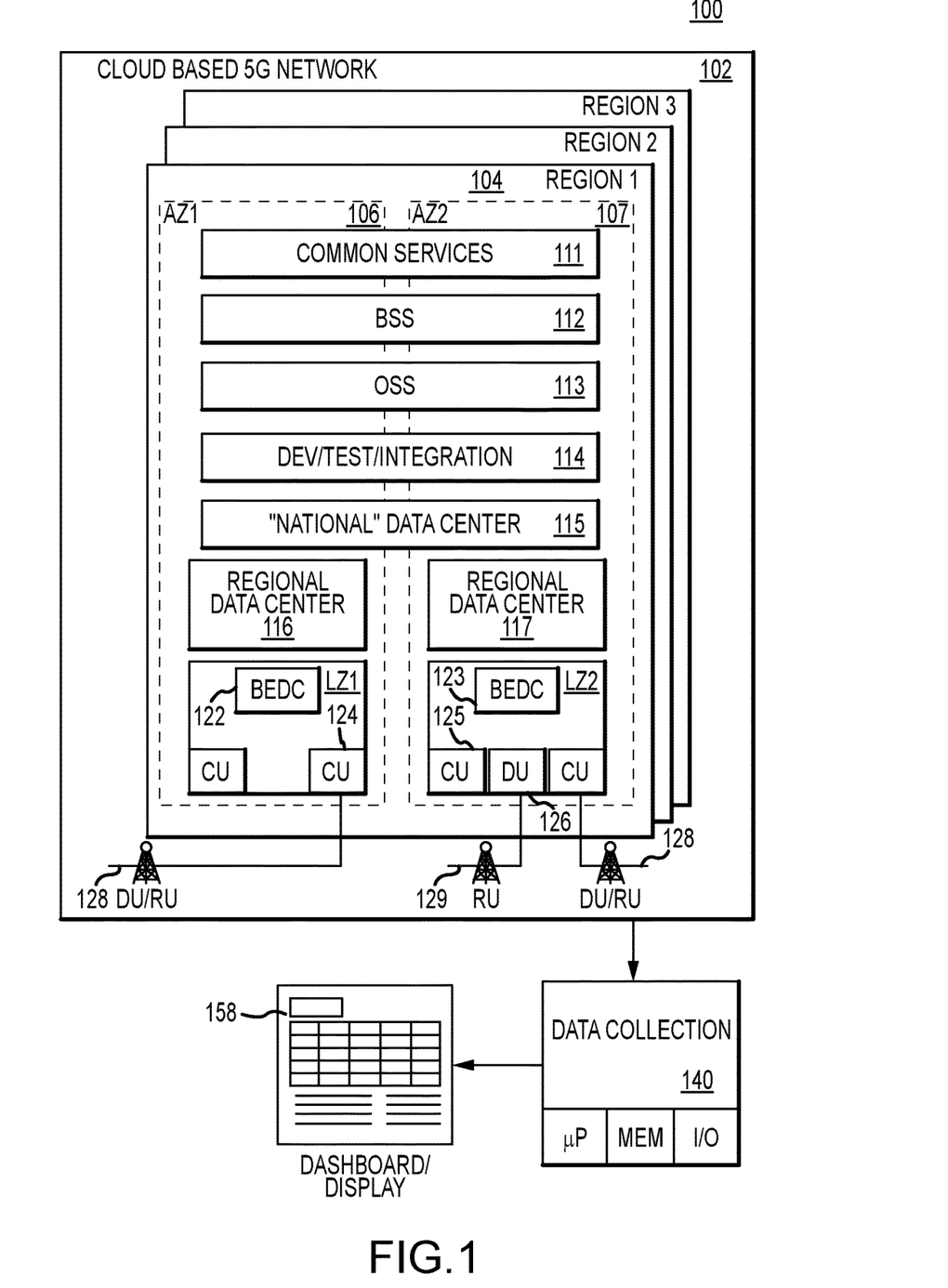
FIG. 1 shows an example of a 5G wireless network that is implemented with a cloud-based computing system.

With reference to FIG. 1, a 5G wireless network 102 can be implemented using cloud-based computing resources, such as those available from Amazon Web Services Inc. (AWS) of Seattle, Washington. Other cloud services are available from Microsoft Corp. of Redmond, Washington, IBM Corp. of Armonk, New York, and others. In the example of FIG. 1, network 102 encompasses data processing services supporting multiple regions 104, each having one or more availability zones (AZs) 106, 107 each acting as a separate data center with its own redundant power, network connectivity and other resources as desired. In some implementations, the various AZs operating within the same region will provide redundancy in the event that another AZ would fail, become overloaded, or otherwise become unavailable. The example of FIG. 1 illustrates three regions, with region 104 having two AZs 106, 107, although other embodiments could include any number of regions and AZs providing any number of services and resources. The regions and zones are often described herein with reference to geographic locations, but in practice the regions and zones could be equivalently organized based upon customer density, user density, expected network demand, availability of electric power and/or bandwidth, and/or any other factors. As noted above, it will still be necessary to deploy radio units (RUs) within broadcast range of end users. By implementing the other functions of the network using virtualized hardware operating within a cloud-type architecture, geographic restrictions upon the network 102 can be greatly reduced. This can provide substantial efficiencies in deployment and expansion of network 102, while also allowing for more efficient use of computing resources, data storage and electric power. However, particular arrangements of each cell site might be required to support such efficiencies.

In example system 100, a network operator maintains ownership of one or more radio units (RUs) located at wireless network cell sites 128, 129. Each RU suitably communicates with user equipment (UE) operating within a geographic area of its respective cell site using one or more antennas/towers capable of transmitting and receiving messages within an assigned spectrum of electromagnetic bandwidth (which may also be referred to herein as a "spectrum band" or "frequency band"). In various embodiments, the assigned spectrum may be allocated across one or more guest networks to support multiple concurrent networks, if desired.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QoS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein.

In the example illustrated in FIG. 1, common services (e.g., billing, guest network allocation, etc.) can be performed in a shared service 111 across the available AZs 106, 107. Typically, these shared services will be implemented within a common virtual private cloud (VPC) operating within the cloud environment. Similarly, shared VPC systems can support business support system (BSS) 112, operational support services (also referred to as operating support system or OSS) 113, development/test/integration features 114, and/or the like across the entire region. A region wide data center (identified as a "national" data center 115 in FIG. 1) could be implemented in a shared VPC across AZs 106, 107, if desired, with subordinate data centers (e.g., "regional" data centers 116, 117) being separated into different VPCs for each of the AZs 106, 107. Additional levels of data centers could be provided, if desired, and/or the different data center functions could be differently organized in any number of equivalent embodiments. The various data centers could provide any number of services such as IP multimedia services (IMS), 5G core services and/or the like.

In the example of FIG. 1, each AZ 106, 107 includes one or more breakout edge data centers (BEDCs) each supporting a local zone (LZ, such as LZ1 or LZ2 in FIG. 1) with one or more cell sites. The BEDCs are ideally organized for very low latency to provide best possible throughput and low latency to the various user equipment operating within the local zone. BEDCs 122, 123 will typically implement one or more CUs 124, 125 in accordance with the O-RAN specifications. BEDCs may also implement user plane functions that handle user data sessions for gaming, streaming and other network services, as desired. Again, any number of BEDCs and other data centers may be implemented using any number of different or shared VPCs in the cloud environment, as desired. The DUs 126 may be provided physically at the cell site 128, 129 or may be remote from the cell site, for example provided by the local zone (e.g., LZ1, LZ2), or any combination thereof depending on each cell site 128, 129. Accordingly, the DU may comprise physical hardware located at a cell site 128, 129 or remote from a cell site, or may comprise virtualized resources as described above.

As noted above, many of the various network components shown in FIG. 1 are typically implemented using software or firmware instructions that are stored in a non-transitory data storage (e.g., a disk drive or solid-state memory) for execution by one or more processors within the VPC. VPCs may provide any number of additional features to support the data handling functions of the system, including redundancy, scalability, backup, key management and/or the like.

In some embodiments, the OSS 113 may comprise or otherwise be in communication with an element management system (EMS) configured to manage the network elements of the system 100. In some embodiments, the EMS can manage a network component or a group of similar network components, for example configuring, reading alarms, or the like for a group of network components. For example, the EMS may implement fault, configuration, accounting, performance, and/or security functions. The EMS may interface with the OSS 113, for example to manage inventory, faults, and configuration. The OSS 113 may interface with one or more EMSs. The EMS may also interface with the various components of the network, for example to manage and/or configure DUs and RUs. The EMS and OSS 113 therefore support deployment of new services and meeting quality of service requirements, among other functions. The EMS and OSS may collectively be referred to herein as the OSS 113. In embodiments without a dedicated EMS, the OSS 113 or other similar management programs may perform the functions described above, which again shall be referred to as OSS 113 herein.

Each RU of a cell site 128, 129 may be associated with a different wireless cell that provides wireless data communications to any number of user devices operating within broadcast range of the cell. For example, a cell site 128, 129 may have antennas arranged to serve three sectors of 120-degree coverage each (e.g., one sector per cell), six sectors of 60 degrees each, or any other suitable arrangement, with each such antenna communicatively coupled with an RU for that sector or cell. Each sector may form separate pie-shaped arcs that, combined, form a circle of 360-degree coverage around the cell site. Each sector may be part of a separate cell (e.g., as is common in a three-sector configuration), or multiple sectors may share the same cell (depending on cell site configuration).

An RU may transmit, receive, amplify, and digitize radio frequency signals, and may be integrated with one or more antennas or may be separate from but communicatively coupled with one or more antennas of the cell site. RUs may be implemented with radios, filters, amplifiers and other telecommunications hardware to transmit and receive digital data streams via one or more antennas. Generally, RU hardware includes one or more processors, non-transitory data storage (e.g., a hard drive or solid-state memory) and appropriate interfaces to perform the various functions described herein. RUs are physically located on-site with the transmitter/antenna, as appropriate. Conventional 5G networks may make use of any number of wireless cells spread across any geographic area, each supported by an on-site RU. In some embodiments, the cell site comprises one RU per sector, and if the cell site is multi-band then it may comprise one RU per band per sector. In some cases, an RU may support multiple bands (a multi-band RU) thus requiring only one RU per sector for multi-band coverage.

User devices are often mobile phones or other portable devices that can move between different cells associated with the different RUs, although 5G networks are also widely expected to support home and office computing, industrial computing, robotics, Internet-of-Things (IoT) and many other devices. While the example illustrated in FIG. 1 shows just a few cell sites 128, 129 for convenience, a practical implementation will typically have any number of cell sites that can each be individually configured, including the RUs at the cell sites, to provide highly configurable geographic coverage for the 5G network 102. Further, the cell sites 128, 129 can be configured for any combination of spectrum bands. For 5G networks, the low band (LB) spectrum comprises frequencies less than 1 GHz, the mid band (MB) spectrum comprises frequencies from 1 GHz to 6 GHz, and the high band (HB) comprises frequencies from 24 GHz to 40 GHz. For example, some cell sites may operate at a single spectrum band, and some cell sites may operate at multiple bands ("multi-band") such as LB and MB. The respective RUs and antennas may be configured to support the assigned spectrum band(s).

It is generally desired to monitor the status of the network 102. As noted above, the various components of the network 102 can be implemented using virtual private clouds (VPC) or other virtual hardware components. Each of these VPCs will typically produce data during operation that indicates status, performance, capacity and/or any number of other parameters. The individual network components, for example RUs, antennas, and/or CSRs, may also provide status, identification (e.g., serial number, MAC address, etc.), configuration, performance, or other relevant information. The large amount of data produced by the various modules and components can be processed to generate dashboards and/or other reports 158 that can be viewed by an operator. Operating data can also be used to adjust the configuration or operation of the network, as desired. By tracking data produced by the various components of network 102, then, the status and performance of the network can be monitored, adjusted, and corrected as desired.

In various embodiments, a data collection system 140 (also referred to herein as a data processing system) may be provided to obtain raw data from one or more of the components of network 102, for example from the RUs, OSS 113, and CSRs. Data may be obtained by querying the components, receiving a data stream from the components, or any other suitable method or combination of methods. Any number of streaming and/or query-based data sources may be deployed within system 100 as desired, and streaming data sources may be intermixed and/or combined with query-based data sources in any manner.

In some embodiments, the data collection system 140 may obtain information about one or more RUs, from the respective RUs, including the serial number and MAC address of the RU. The data collection system 140 may obtain information from the CSR including interface information (e.g., address or other identifier, status, assigned RU, labels, etc. regarding each physical port on the CSR), status of the CSR, MAC address of connected devices, IP addresses, operating temperature of the CSR and/or transceivers, transmitter power, receiver power, label or other identifier of the CSR device, and the like. The transmitter and/or receiver information may be obtained directly from the RU in some cases.

A MAC (Media Access Control) address is a unique (often alphanumeric) attribute assigned to and used to identify each individual device on a network. The MAC address for a device may be assigned (via one-time programmable fuses, flash memory, or the like) at the time of manufacture, and/or may be programmed or reprogrammed into the device as desired. The network device, for example an RU, may communicate its MAC address to connected devices, such as a CSR. The CSR may store information about each port of the CSR, including the MAC address of a device connected to the port. The CSR may store a mapping of each CSR port to a MAC address, which may comprise a list, table, or other suitable data structure. The CSR may provide information about the mapping of a particular port to a MAC address, may provide information about the entire mapping of ports to MAC addresses, or the like, upon receiving a request for such information (e.g., an interface status request).

The data collection system 140 may obtain information from the OSS 113, for example collecting, for each RU at a cell site, an assigned site and sector identifier, a serial number, administrative state, operational state, cell state, a label for the RU (e.g., identifying the cell site, spectrum band, and sector the RU is intended to cover), IP address, tilt and other configuration and identifying information (e.g., serial number) for an antenna to be coupled with the RU, other identifying or model information for the RU, coupled antennas, or cell site, and the like.

The data collection system 140 may be implemented using any sort of computing hardware, such as any sort of processor (µP), memory or other non-transitory data storage and input/output (I/O) interfaces for data communications and/or the like. The data collection system 140 may comprise an interface (e.g., I/O) to the network 102, for example via wired or wireless networking, application programming interface (API) calls within a software operating environment, virtualized connections, or the like, by which it can collect the various data from the network 102 as described herein. In various embodiments, hardware is abstracted by virtual computing resources available from AWS or another cloud computing platform. In some embodiments, the data collection system 140 may be implemented via program instructions configured to run on a computing device (implemented with conventional hardware, virtualized hardware, and/or cloud-based resources as desired) such as a computer server that queries the monitored components according to any desired time schedule to receive data, queries the monitored components on demand, receives data stream from the monitored components, or the like. The data received by the data collection system 140 may be locally cached or otherwise stored in any sort of non-transitory memory (e.g., solid state memory, magnetic or optical memory, cloud-based sources, and/or the like) for subsequent retrieval and processing as desired and as described herein. Each monitored component may be internally configured to write its output/log data to data collection system 140, as desired.

The data collection system 140 may communicate with the monitored components directly and/or through one or more intermediary components or data sources to obtain the desired data. The data collection system 140 may format and/or filter the obtained data as appropriate, and forward and/or store the collected and possibly processed data for reporting and/or any other further processing as desired. In various embodiments, the data collection system 140 may receive data in one or more formats, may append source and/or service location (e.g., cell site, sector, spectrum band) information as tags or the like, and may push and/or store the tagged data for further processing, display, or the like (using, e.g., HTTP structures or the like). In some embodiments, the data collection system 140 may process, format, and/or forward the obtained data for presentation via a dashboard 158, web interface, alert system, and the like. Some embodiments may also filter the received data as desired to remove unwanted or unnecessary data that would otherwise consume excess storage or require additional processing. Other embodiments may perform additional monitoring, as needed.

In various embodiments, the data collection system 140 stores received data in a database 155 or other data structure for later retrieval, as desired. The data collection system 140 may also provide reports to human and/or automated reviewers. One or more dashboards may be presented on any display 158, for example. Reports can be used to monitor the status of network 102, to determine the configuration or operation of network 102 (or any component thereof), and/or for any other purpose. The data collection system 140 may further provide real-time alerts (e.g., via email, text message or the like) to human operators if certain events occur, such as incorrect (e.g., swapped) equipment connections (misconnections), outages, shutdowns, security breaches and/or the like. Other embodiments could implement the various functions and components described herein in any number of equivalent arrangements.

As described above, 5G networks such as network 102 may be continually and rapidly expanding and evolving, and a large number of cell sites may require initial setup and ongoing maintenance. Setting up and maintaining numerous cell sites may be facilitated by standardizing or otherwise prescribing how the cell sites are to be set up. For example, a particular cell site or type of cell site may have a predetermined configuration including number and model of RUs, CSRs, antennas, and the like, and may include how such components are to be communicatively coupled. Further, the configuration may assign each RU (e.g., identified by serial number, MAC address, or the like) to a specific sector, spectrum band(s), port connection on the CSR, IP address, and the like.

The predetermined configuration may label (or name) each RU based on its assigned spectrum band(s), sector, cell site, or the like. For example, an RU label may be in the format of SITE_BAND_SECTOR, such that an RU at site "1234" and assigned to LB and sector 1 would have a label of "1234 LB_1." Any suitable label formatting may be used. The predetermined configuration may include a predetermined port configuration for the CSR, for example a schema for which physical port (e.g., identified by port number) is to be coupled with an RU of a specific spectrum band and/or sector. For example, the predetermined configuration may assign ports 4, 6, and 8 to the LB RUs for sectors 1, 2, and 3, respectively, and may assign ports 5, 7, and 9 to the MB RUs for sectors 1, 2, and 3, respectively. The prescribed configuration, or mapping, may be managed, in part, by the OSS 113.

Figure 2A:
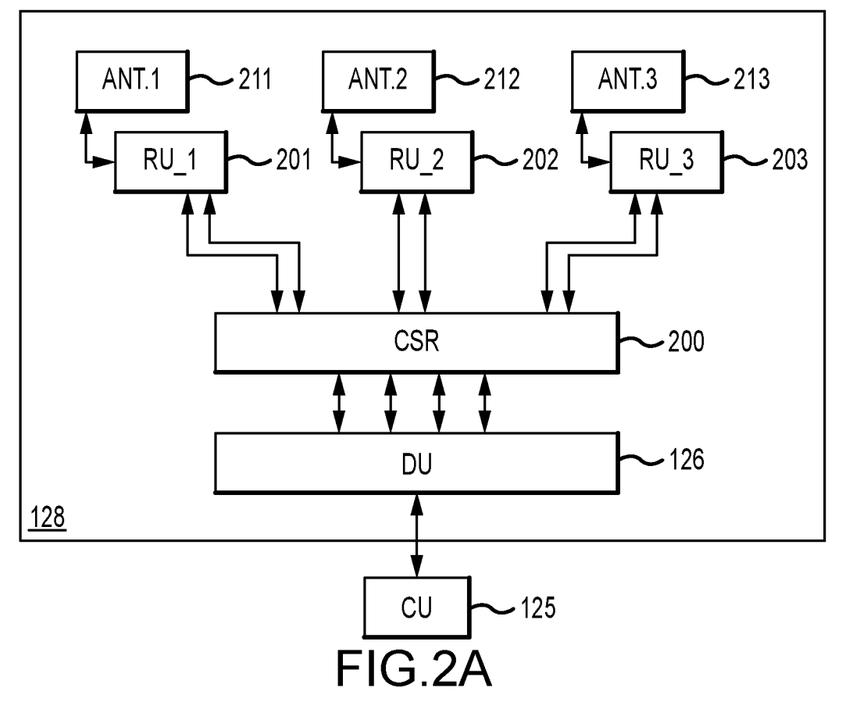
FIG. 2A is a block diagram illustrating a first exemplary arrangement of components associated with a cell site of the 5G wireless network.
Figure 2B:
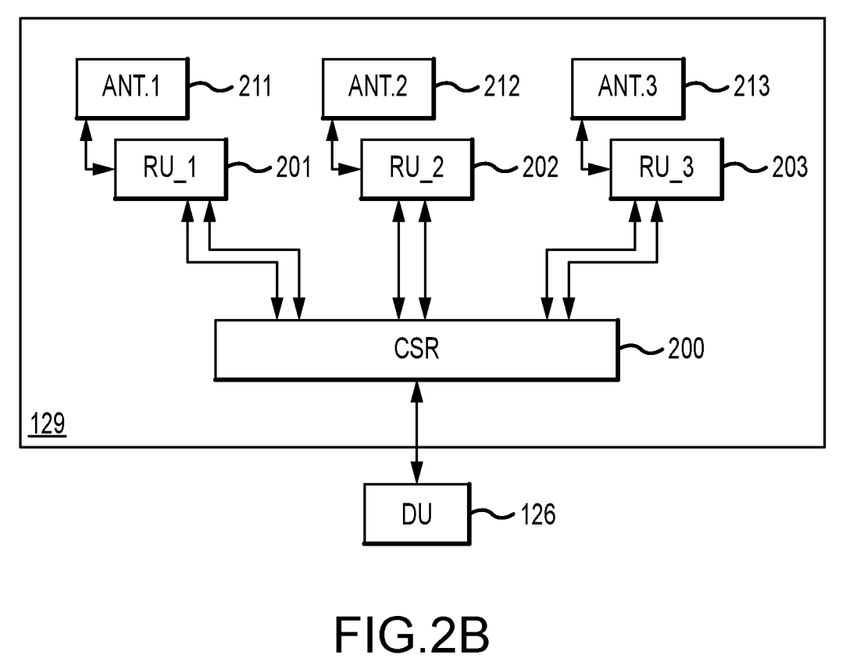
FIG. 2B is a block diagram illustrating a second exemplary arrangement of components associated with a cell site.

Referring to FIGS. 2A and 2B, cell sites 128, 129 may be configured in a number of suitable arrangements. Referring to FIG. 2A, for example, a cell site 128 may comprise a CSR 200, a DU 126, one or more RUs 201, 202, 203, and one or more antennas 211, 212, 213. Each RU 201, 202, 203 may be electrically coupled with antennas 211, 212, 213, respectively. Each connected group of RU and antenna may serve a cell sector. For example, a first RU 201 coupled with a first antenna 211 may serve a first sector, a second RU 202 coupled with a second antenna 212 may serve a second sector, and a third RU 203 coupled with a third antenna 213 may serve a third sector. Further, each such RU-antenna group may serve the respective sector in one or more spectrum bands, e.g., LB, MB, HB, or any combination thereof. Specific RUs 201, 202, 203 (e.g., identified by serial number, MAC address, RU label, or the like) and specific antenna types (e.g., identified by model number) may be assigned to specific sectors and spectrum bands.

The RU 201, 202, 203, CSR 200, and in some cases the DU 126 may be in a local area network (LAN) configuration. The LAN configuration may comprise, for example, an Ethernet-based network, and may comprise wired connections, fiber optic connections, and/or the like between the various components. The CSR 200 may have input/output connections (e.g., ports) for multiple RUs 201, 202, 203 and one or more DU 126. The CSR 200 ports may comprise, for example, small form pluggable (SFP) ports, RJ45 ports, or the like. Each CSR 200 port may be uniquely identified by the CSR 200 and the network 102 in any suitable manner, for example by numbering (e.g., ports 1 through 8), alphanumeric label, or the like.

The CSR 200 may function as a network router and may aggregate the cell data traffic from the cell site 128, 129 and transmit the aggregated data to the network 102, for example via the DU 126. The CSR 200 may be communicatively coupled with the one or more RUs 201, 202, 203 and one or more DUs 125 via the CSR 200 ports. When a CSR port is coupled with an RU, the CSR 200 may receive a MAC address and/or other information from the coupled RU. The CSR 200 may then associate, for example in memory or other data storage, the MAC address or other information with the port to which such RU is connected. The CSR 200 may also have an assigned IP address for each port, for example via predetermined static IP addresses (e.g., as part of a predetermined configuration described above), dynamic host configuration protocol (DHCP), or the like. In this manner, the CSR 200 can associate each port with an IP address, MAC address, and other desired information.

In some embodiments, network traffic routing, such as static routes, segments routes, port forwarding, or the like, may be predetermined for one or more ports of the CSR 200. These configurations may be based on the intended sector and spectrum band of the particular RU 201, 202, 203 to which the port is intended to be connected. In some embodiments, the network 102 may still maintain some (or most) functionality if an RU is connected to the wrong CSR port, but the OSS 113 labels/identifiers will not correctly match the RUs, which may cause maintenance, reporting, and other issues. Further, such misconnected RUs may become configured with an incorrect predetermined configuration, leading to other performance and operational issues.

The network 102, for example the data collection system 140, may access the CSR 200 to obtain this information. In some embodiments, the data collection system 140 may send an instruction to the CSR 200 to request information about the current state of the interface (e.g., ports) of the CSR 200. The CSR may reply with information regarding each port, including an identifier for the port (e.g., numeric), an associate MAC address, an associated IP address, status of the port, and the like. In some embodiments, each RU 201, 202, 203 may comprise a unique serial number and MAC address. The network 102, for example the data collection system 140, may similarly access each RU 201, 202, 203, for example via the CSR 200, to obtain this information. In various embodiments, the RUs 201, 202, 203, DU 126, CSR 200, and data collection system 140 are communicatively coupled (e.g., via hardware or software interface) with the OSS 113.

Each RU 201, 202, 203 may be designed and/or configured to support a single spectrum band (single band) or multiple spectrum bands (multi-band). A cell sector that is to be serviced by multiple bands (e.g., LB and MB) may require multiple separate RUs, each serving a different spectrum band, to provide the expected coverage for the sector. Each of the separate RUs for the sector may be coupled to separate ports of the CSR 200. Alternatively, a single multi-band RU may be able to provide the multi-band service to the sector. In such a case, the multi-band RU may have one connection to a port of the CSR 200 or may have multiple connections to multiple ports of the CSR 200 (e.g., one port connection for each band). In such cases, the CSR 200 may physically or logically identify a single port (and corresponding MAC address and IP address) per band of the multi-band RU.

Each DU 126 may support multiple cells or cell sites, and the CSR 200 may be communicatively coupled with one or more DUs 125. In some embodiments, referring still to FIG. 2A, the DU 126 may be located at the cell site 128. Referring to FIG. 2B, in another example, the DU 126 may be located external to the cell site 129, for example implemented via cloud computing, for example at a local zone, with the connections between DU 126, CSR 200, RUS 201, 202, 203, and antennas 211, 212, 213 being as described above.

In various embodiments, the information (i.e., data) obtained by the data collection system from the RUs 201, 202, 203, CSR 200, OSS 113, and/or other network components, is at least temporarily stored in a database or other storage available to data collection system 140 for subsequent processing. The data can also be formatted, as desired, so that data received from different sources can be collectively processed and used in the determination and reporting functions described below. Generally speaking, many embodiments will place received data into a relatively consistent format that can be analyzed and processed by the data collection system 140 to permit dashboards, alerts, and reports (each of which may be represented in FIG. 1 by the dashboard/display 158) to be generated by a common system from different types of data that have been collected about the network 102.

In various embodiments, the data received from the various data sources is automatically tagged with metadata or other information about the data source, the method of collection, dates and/or times of collection, and/or any other information that may be desired. Tagging may be performed by associating the data values with other relevant information within an extensible markup language (XML) structure, a Javascript object notation (JSON) structure and/or any other format desired. Reports may be generated in response to queries received via an API, web browser interface or other user interface, or the like, as desired. Dashboards may be generated for real time presentation to monitor current status of the network 102 and/or its components.

Figure 3:
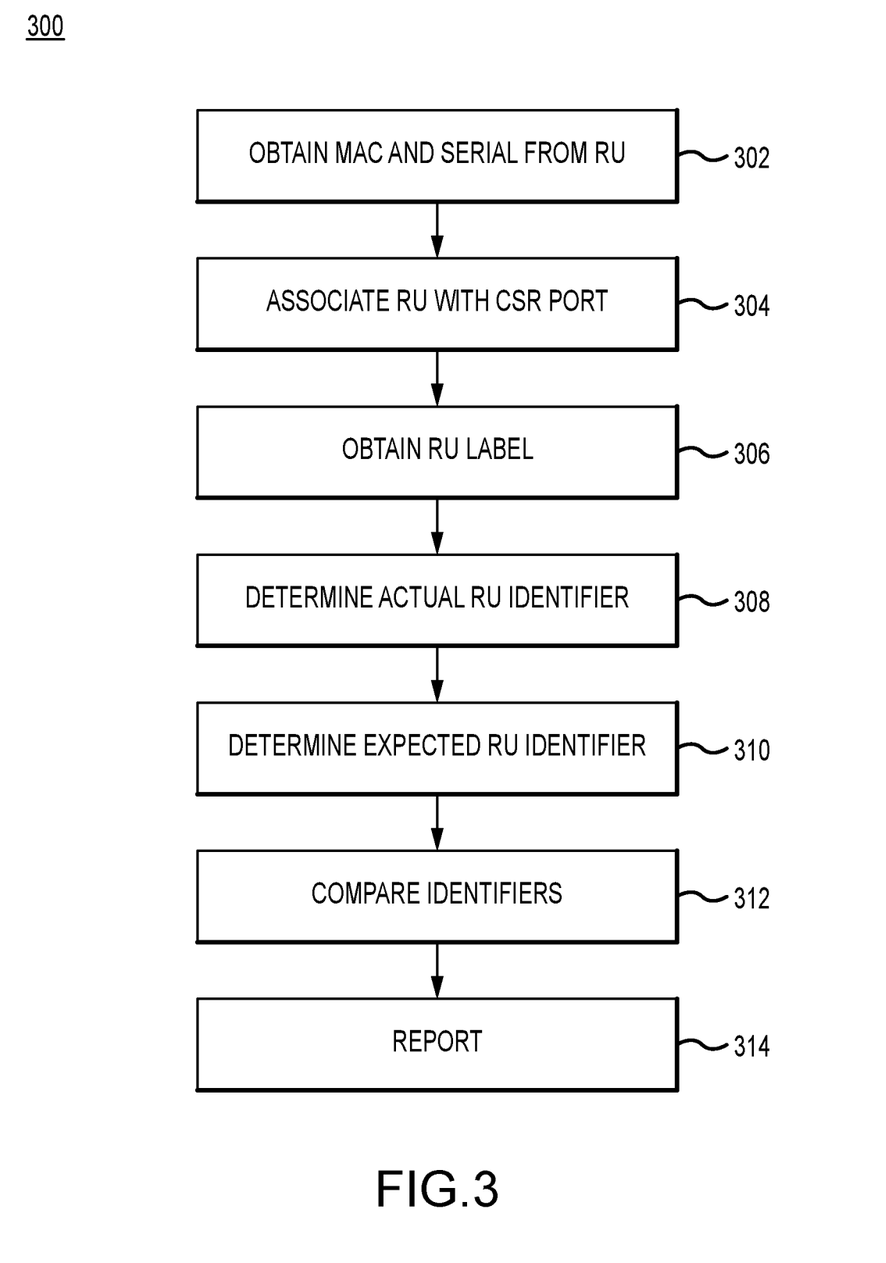
FIG. 3 is a flowchart illustrating an example of an automated process to detect misconnection of one or more cell site components.

FIG. 3 is a flowchart illustrating an example of an automated process to detect improper connection (misconnection) of one or more cell site components, performed by a data collection system 140 and/or other components of a wireless network system 100. The various functions shown in FIG. 3 and FIG. 4 may be distributed amongst the various components of system 100 in any manner, and different embodiments may organize the processing of various features in any number of different ways.

Process 300 suitably includes the broad functions of obtaining a MAC address and serial number from an RU (function 302) communicatively coupled to a CSR 200 (a connected RU), associating the connected RU with a CSR 200 port (function 304), obtaining an RU label for the RU (function 306), determining a actual RU identifier (function 308), determining an expected RU identifier (function 310), and comparing the actual RU identifier to the expected RU identifier (function 312). The process 300 may be performed for each RU at a cell site, each RU coupled with a CSR 200, or the like. The process 300 may further include reporting (function 314) whether an RU is correctly or incorrectly connected to the CSR (incorrect connections may be referred to as misconnected or swapped).

The MAC address and serial number of the RU may be obtained (function 302) in any suitable manner. In some embodiments, the data collection system 140 may request this information directly from the RU, for example via the CSR 200. In some embodiments, the data collection system 140 may obtain this information from or through the OSS 113 or other network management system.

The RU may be associated with the CSR port (function 304) in any suitable manner. In some embodiments, the obtained RU MAC address (function 302) may be associated with the CSR port having the same MAC address. The CSR port information, including MAC address for each port, may be obtained via sending a request for interface information to the CSR as described above. The association of function 304 may comprise storing the information in a formatted table, database, spreadsheet, or other data structure. Upon completion of function 304, the data collection system 140 has determined which RU is connected to a particular CSR port.

The RU label for the RU may be obtained (function 306) in any suitable manner. The RU label may be obtained based on the obtained serial number (function 302). In some embodiments, the OSS 113 may have a predetermined RU label associated with each RU according to identifying information of the RU, such as the serial number. The OSS 113 may therefore have a mapping of RU serial number to RU label, and in some embodiments, the OSS 133 may create the RU label automatically. In some embodiments, the OSS 113 may be queried, for example by the data collection system 140, for the RU label based on the obtained serial number of the RU (from function 302). As described above, the RU label may comprise information corresponding to the cell site, assigned sector, and assigned spectrum band for that RU. In some alternative embodiments, the OSS 113 may be queried for information corresponding to a cell site sector and a spectrum band based on the obtained serial number, and the data collection system 140 may determine the RU label from such information.

The data collection system 140 may determine an actual RU identifier (function 308) which may comprise relevant information related to the RU that is associated with the CSR port (from function 304). In some embodiments, the data collection system 140 may convert the RU label obtained in function 306 to the actual RU identifier. For example, the RU label may comprise information corresponding to the assigned sector and spectrum band of the RU, and the actual RU identifier may comprise information related to the assigned spectrum band and sector of the RU. In an exemplary embodiment, the actual RU identifier may comprise an alphanumeric string formatted as BAND_SECTOR, for example "LB_2" for the RU assigned to cover sector 2 LB, and "MB_1" for the RU assigned to cover sector 1 MB. In some embodiments, the RU label is formatted in a similar or same manner as the actual RU identifier and function 308 may be skipped as the RU label can be used directly for the comparison of function 312 described below.

The data collection system 140 may determine an expected RU identifier (function 310) which may comprise relevant information related to an RU that is expected to be connected to the associated CSR port from function 304. The expected RU identifier is therefore based on the associated CSR port. The expected RU identifier may comprise information related to the assigned spectrum band and sector of the RU that is expected to be connected to the associated CSR port, and in some embodiments may be of the same format as the actual RU label for ease of comparison in function 312.

In some embodiments, the data collection system 140 may determine the expected RU identifier based on the port identifier such as a port number of the associated CSR port. For example, as described above, the CSR 200 may have an assigned predetermined configuration (or mapping) for the connection of its ports to the various RUs of a cell site. The data collection system 140 may therefore determine the expected RU identifier based on the port number of the associated CSR port. By way of the example of the predetermined configuration described above, if the associated CSR port is port number 5, the RU covering sector 1 MB should be connected to the port, and if the associated CSR port is port number 8, the RU covering sector 3 LB should be connected to the port. In an exemplary embodiment using the same formatting as the example actual RU identifier described above, the expected RU identifier may then be "MB_1" for CSR port number 5 and "LB_3" for CSR port number 8.

The data collection system 140 may perform a comparison (function 312) to determine if the correct RU is connected to the associated CSR port (from function 304). In some embodiments, the data collection system 140 may compare the expected RU identifier to the actual RU identifier (function 312), and if they match then a determination is made that the correct RU is connected to the associated CSR port, with a mismatch determining an incorrect RU connection to the CSR. The comparison may be performed in any suitable manner, for example a string comparison, comparing the identified sectors and spectrum bands, or the like.

In some embodiments, the RU label obtained in function 306 may already be in sufficient format for comparison, for example including the sector and spectrum band identifiers in a form that can be used in a string comparison with the expected RU identifier without having to create the actual RU identifier of function 308. In some embodiments, the data collection system 140 may directly compare the spectrum band and sector of the actual and expected RUs without creating the identifiers. For example, function 308 may comprise determining and storing in memory (e.g., as variables) the spectrum band and sector from the RU label (from function 306), and function 310 may comprise determining and storing in memory the spectrum band and sector from the associated CSR port (from function 304), without creating the separate RU identifiers described above. In some embodiments, the OSS 113 may directly return actual RU identifier based on the serial number such that obtaining the RU label is unnecessary, may directly return the spectrum band and sector based on the serial number, or the like, such that some of the steps of process 300 can be skipped or appropriately modified.

The data collection system 140 may report (function 314) the connection of the various RUs of a cell site to the CSR of the cell site. For example, the report may comprise a table identifying each CSR port, an associated MAC address and/or serial number of the associated RU, an IP address, the RU label for the associated RU, the actual RU identifier and/or expected RU identifier, a "SWAP" field indicating whether the associated RU for a port is connected correctly (e.g., no swap) or is connected incorrectly (e.g., swapped, misconnection, or the like). In some embodiments, the data collection system may report a CSR port having no RU connection where one is expected (for example, by determining that no MAC address was associated with a port to which an RU connection was expected). In addition, the data collection system 140 may audit from the CSR the interface status, temperature, TX/RX power against expected values or thresholds, may audit from the OSS 113 an administrative state, operational state, cell state, status of the antennas, or the like, and may include one or more of this information in the report.

Alerts (e.g., text message or email alerts) could be generated based upon one or more data values passing a threshold, detecting an RU misconnection, in response to detected RU issues, or other important events occurring within system 102 and particularly a cell site 128, 129, and/or based upon any other factors. Any number of electronic outputs may be provided for display, publication and/or messaging, as desired.

In some embodiments, the data collection system 140 may also determine if a connection between the RUs and the antennas is a daisy chain or single connection. For example, the antennas may receive a remote electrical tilt (RET) control signal, for example via an Antenna Interface Standards Group (AISG) compatible port. The antennas may receive individual (single) connections from the RUs, or may be configured with internal or external jumpers among the RET ports in a daisy chain configuration.

In some embodiments, the report (function 314) may comprise updating a user interface, for example on a display associated with the network 102 and/or data collection system 140, storing the reported information in a database or other data storage for concurrent or later retrieval, sending a notification, alert, etc., and the like. In some embodiments, the report or user interface may comprise the ability to allow a user to query a specific cell site 128, 129, which can initiate the process 300 for one or more of the RUs at the cell site and resulting in an updated report (function 314) for the queried cell site.

The various information may be obtained in process 300 by requesting and receiving the information from or through the OSS 113, may be pulled directly from each of the individual network components, any combination thereof, and/or any other suitable method of obtaining such information related to the RUs and CSR. Process 300 may be performed upon request, e.g., for a user of a user interface associated with the data collection system 140 and/or network 102, may be performed at regular predetermined intervals, may be performed upon initial setup or maintenance of a cell site, or based on any other suitable trigger. The various functions shown in FIG. 3 may be distributed amongst the various components (including virtual components) of system 100 in any manner, and different embodiments may organize the processing of various features in any number of different ways. Systems, such as data collection system 140, performing the functions described herein may be referred to as swap detection systems.

Figure 4:
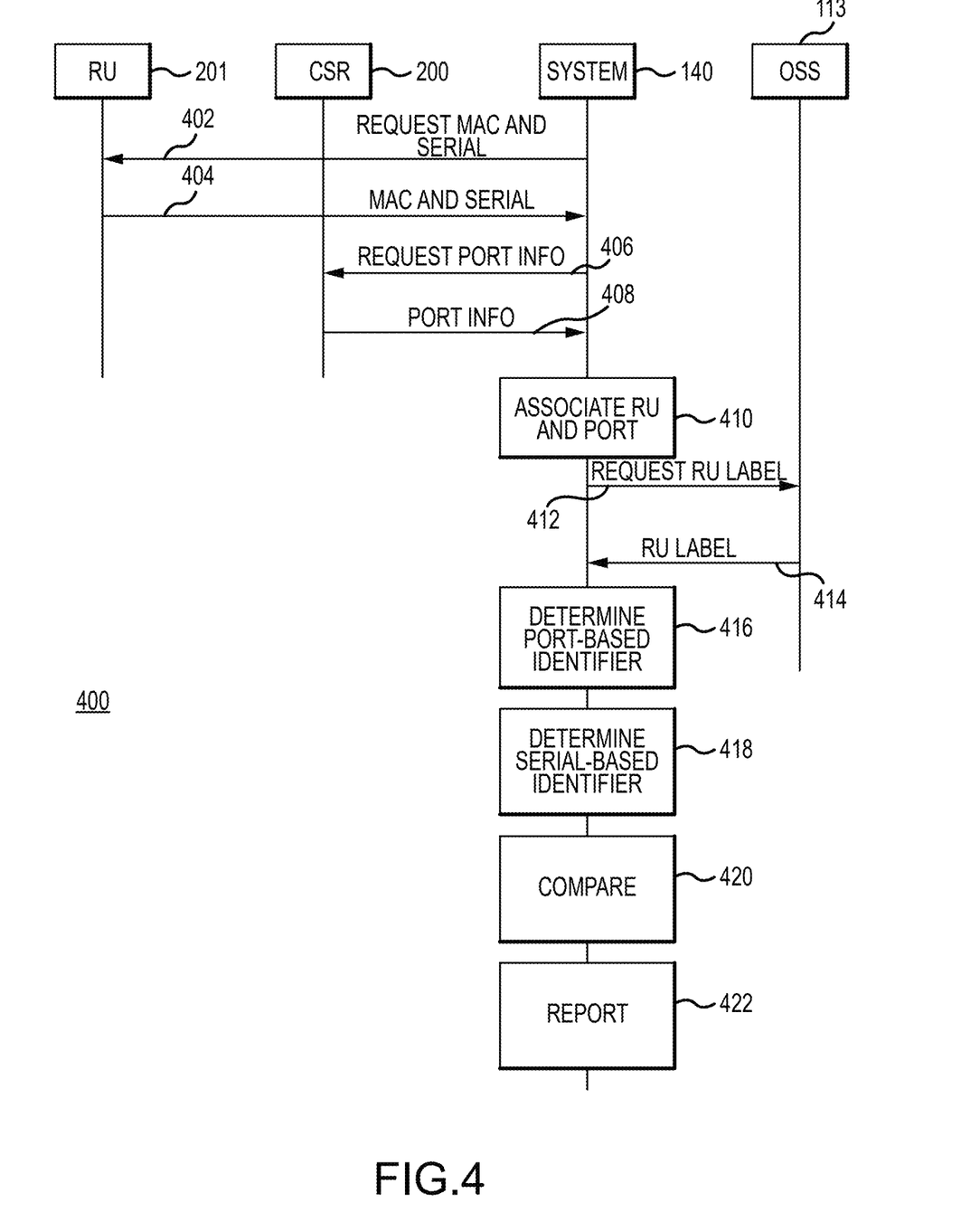
FIG. 4 is a flow diagram illustrating an example of an automated process to detect misconnection of one or more radio units of a cell site.

FIG. 4 is a flow diagram showing an exemplary embodiment 400 of the process 300 for detecting misconnection of one or more RUs of a cell site. The data collection system 140, at step 402, may request the MAC address and serial number of one of the RUs (e.g., RU 201) of the cell site 128, 129. The RU 201, a step 404, in response to the request, may transmit its MAC address and serial number to the system 140. The system 140 may then request, at step 406, interface information from the CSR, for example a general request for information regarding all ports or a specific request for the port identifier associated with the MAC address. The CSR may transmit, at step 408, the requested information about the one or more ports to the system 140. The system 140, at step 410, may associate the RU 201 with a specific port of the CSR based on the MAC address, for example by determining the CSR port having a MAC matching the MAC of the RU 201. The system 140, at step 410, may also associate the serial number of the RU 201 with the associated CSR port. At step 412, the system 140 may request an RU label from the OSS 113 based on the serial number, and at step 414 the OSS 113 may transmit the requested RU label to the system 140.

At step 416, the system 140 may determine a port-based RU identifier, for example the expected RU identifier based on the associated CSR port. The expected RU identifier may comprise the spectrum band and sector number as described above. At step 418, the system 140 may determine a serial number-based RU identifier, for example the actual RU identifier based on the obtained serial number. The system 140 may then, at step 420, compare the port-based RU identifier to the serial number-based RU identifier. In some embodiments, steps 418 and 420 are combined, for example when the RU label comprises the actual RU identifier and the comparison compares the expected RU identifier to the portion of the RU label containing the actual RU identifier. At step 422, the system 140 may report the comparison results for one or more RUs of the cell site (or more than one cell site, as desired), noting any RUs that are misconnected. Step 422 may comprise the reporting function 312.

Various embodiments therefore provide a data collection and processing system that can monitor the operations of a 5G wireless network 102 and/or its various components, particularly equipment operating at a cell site such as the RU and CSR. In contrast to prior systems that were unable to process a holistic view of the status and connection status of cell sites, systems and methods as described herein are able to source and analyze the necessary information to make determinations regarding the status of cell site equipment connectivity. Other embodiments may provide additional benefits and features, as desired.

Each of the various features and systems described herein may be implemented in software and/or firmware that resides in non-transitory data storage for execution by one or more processors to perform the various automated processes described herein.

The general concepts set forth herein may be adapted to any number of alternate but equivalent embodiments. The term "exemplary" is used herein to represent one example, instance or illustration that may have any number of alternates. Any implementation described herein as "exemplary" is not necessarily to be construed as preferred or advantageous over other implementations, nor is it necessarily intended as a model that must be duplicated in other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process performed by a data processing system associated with a 5G wireless network, the data processing system comprising a processor, a data storage, and an interface to the wireless network, the wireless network comprising an operating support system (OSS) and a cell site remote from the OSS and the data processing system, the cell site having one or more radio units (RUs) and a cell site router (CSR), the automated process comprising:
    obtaining, via the interface to the wireless network and from a first RU of the one or more RUs, a MAC address and a serial number;
    associating, by the processor, a CSR port with the first RU based on the obtained MAC address;
    determining, by the processor, an expected RU identifier based on the associated CSR port;
    obtaining, via the interface to the wireless network and from the OSS, an RU label based on the obtained serial number;
    determining an actual RU identifier based on the RU label;
    comparing, by the processor, the actual RU identifier to the expected RU identifier; and
    reporting, by the processor, an RU misconnection in response to the actual RU identifier mismatching the expected RU identifier, comprising providing a real-time alert to a human operator identifying the RU misconnection.

2. The automated process of claim 1, wherein the cell site has a plurality of RUs and the automated process is performed for each RU of the plurality of RUs.

3. The automated process of claim 1, wherein associating the CSR port with the first RU comprises:
    obtaining, for one or more CSR ports, a mapping of each CSR port to a MAC address of a connected RU; and
    determining the CSR port that is mapped to the obtained MAC address.

4. The automated process of claim 1, wherein the expected RU identifier and the actual RU identifier each comprise an indication of cell site sector.

5. The automated process of claim 4, wherein the expected RU identifier and the actual RU identifier each comprise an indication of spectrum band.

6. The automated process of claim 5, wherein:
    determining an expected RU identifier comprises determining spectrum band and cell site sector based on the associated CSR port; and
    determining an actual RU identifier comprises determining spectrum band and cell site sector based on the RU label.

7. The automated process of claim 1, wherein reporting an RU misconnection comprises presenting an indication of the RU misconnection on a user interface of the data processing system.

8. The automated process of claim 2, wherein the RU misconnection comprises at least one selected from the group of the first RU not communicatively coupled with the CSR and the first RU communicatively coupled with an incorrect CSR port.

9. The automated process of claim 3, further comprising associating the determined CSR port with the obtained serial number.

10. A data processing system associated with a 5G wireless network, the data processing system comprising a processor, a data storage, and an interface to the wireless network, the wireless network comprising an operating support system (OSS) and a cell site remote from the OSS and the data processing system, the cell site having one or more radio units (RUs) and a cell site router (CSR), the data storage comprising non-transitory computer-executable instructions that, when executed by the processor, perform an automated process comprising:

obtaining, via the interface to the wireless network and from a first RU of the one or more RUs, a MAC address and a serial number;

associating, by the processor, a CSR port with the first RU based on the obtained MAC address;

determining, by the processor, an expected RU identifier based on the associated CSR port;

obtaining, via the interface to the wireless network and from the OSS, an RU label based on the obtained serial number;

determining an actual RU identifier based on the RU label;

comparing, by the processor, the actual RU identifier to the expected RU identifier; and reporting, by the processor, an RU misconnection in response to the actual RU identifier mismatching the expected RU identifier, comprising providing a real-time alert to a human operator identifying the RU misconnection.

11. The system of claim 10, wherein the cell site has a plurality of RUs and the automated process is performed for each RU of the plurality of RUs.

12. The system of claim 10, wherein associating the CSR port with the first RU comprises:
obtaining, for one or more CSR ports, a mapping of each CSR port to a MAC address of a connected RU; and
determining the CSR port that is mapped to the obtained MAC address.

13. The system of claim 10, wherein the expected RU identifier and the actual RU identifier each comprise an indication of spectrum band and cell site sector.

14. The system of claim 13, wherein:
determining an expected RU identifier comprises determining spectrum band and cell site sector based on the associated CSR port; and
determining an actual RU identifier comprises determining spectrum band and cell site sector based on the RU label.

15. The system of claim 10, wherein reporting an RU misconnection comprises presenting an indication of the RU misconnection on a user interface of the data processing system.

16. The system of claim 11, wherein the RU misconnection comprises at least one selected from the group of the first RU not communicatively coupled with the CSR and the first RU communicatively coupled with an incorrect CSR port.

17. The system of claim 12, wherein associating the CSR port with the first RU further comprises associating the determined CSR port with the obtained serial number.

18. An automated process performed by a data processing system associated with a 5G wireless network, the data processing system comprising a processor, a data storage, and an interface to the wireless network, the wireless network comprising an operating support system (OSS) and a cell site remote from the OSS and the data processing system, the cell site having one or more radio units (RUs) and a cell site router (CSR), the automated process comprising:

obtaining, via the interface to the wireless network and from a first RU of the one or more RUs, a MAC address and a serial number;

associating, by the processor, a CSR port with the first RU based on the obtained MAC address;

determining, by the processor, a first cell site sector and a first spectrum band based on the associated CSR port;

obtaining, via the interface to the wireless network and from the OSS, an RU label based on the obtained serial number;

determining a second cell site sector and a second spectrum band based on the RU label;

comparing, by the processor, the first cell site sector to the second cell site sector and the first spectrum band to the second spectrum band;

determining, by the processor, an RU misconnection when at least one of the first and second cell site sector and the first and second spectrum band do not match; and providing a real-time alert to a human operator identifying the RU misconnection.

19. The automated process of claim 18, wherein:
the first cell site sector and the first spectrum band are determined based on a port number of the associated CSR port.

20. The automated process of claim 18, further comprising reporting the determined RU misconnection on a user interface of the data processing system.

* * * * *